(12) United States Patent
Lu

(10) Patent No.: US 6,570,683 B1
(45) Date of Patent: May 27, 2003

(54) WAVELENGTH RE-USE

(75) Inventor: Xiaolin Lu, Middletown, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/428,521

(22) Filed: Oct. 28, 1999

(51) Int. Cl.[7] .................. H04B 10/24; H04B 10/20; H04J 14/00; H04J 14/02
(52) U.S. Cl. .................. 359/114; 359/119; 359/124
(58) Field of Search ................ 359/114, 119, 359/124

(56) References Cited

U.S. PATENT DOCUMENTS

| | | | | |
|---|---|---|---|---|
| 5,319,485 A | * | 6/1994 | Yasui et al. | 359/124 |
| 5,455,699 A | * | 10/1995 | Glance et al. | 359/124 |
| 5,517,498 A | * | 5/1996 | Hauris et al. | 359/119 |
| 5,576,875 A | * | 11/1996 | Chawki et al. | 359/119 |
| 5,774,244 A | * | 6/1998 | Tandon et al. | 359/119 |
| 5,963,348 A | * | 10/1999 | Oberg | 359/114 |
| 5,999,288 A | * | 12/1999 | Ellinas et al. | 359/119 |
| 6,115,516 A | * | 9/2000 | Watson et al. | 385/147 |
| 6,339,488 B1 | * | 1/2002 | Beshai et al. | 359/119 |
| 6,381,046 B1 | * | 4/2002 | Wilfong et al. | 359/119 |

* cited by examiner

Primary Examiner—Leslie Pascal
Assistant Examiner—David C. Payne

(57) ABSTRACT

The invention assigns wavelengths to nodes in such a way that wavelengths may be reused thus achieving a minimum number of wavelengths for any network. A starting node and a direction within the network is first selected. N−1 wavelengths are assigned to the starting node where N is a number of nodes in the network. A second node adjacent to the starting node is selected and N−1 wavelengths already assigned to the starting node are tentatively assigned to the second node avoiding conflicts where possible. A conflict occurs when a transmission by the second node to a destination node must traverse a connection that may already be traversed by a transmission of the same wavelength by the starting node. New wavelengths are assigned to the node for destination nodes for which no prior assigned wavelengths may be used due to conflicts. Then, a third node is selected and wavelengths are assigned as for the second node except all prior assigned wavelengths are tested for conflicts first before assigning new wavelengths. The process continues until all the nodes are selected and wavelengths assigned. The above assignment may be applied for unidirectional or bidirectional connections. For bidirectional connections, the same wavelength may be used for transmission in both directions without a conflict.

13 Claims, 8 Drawing Sheets

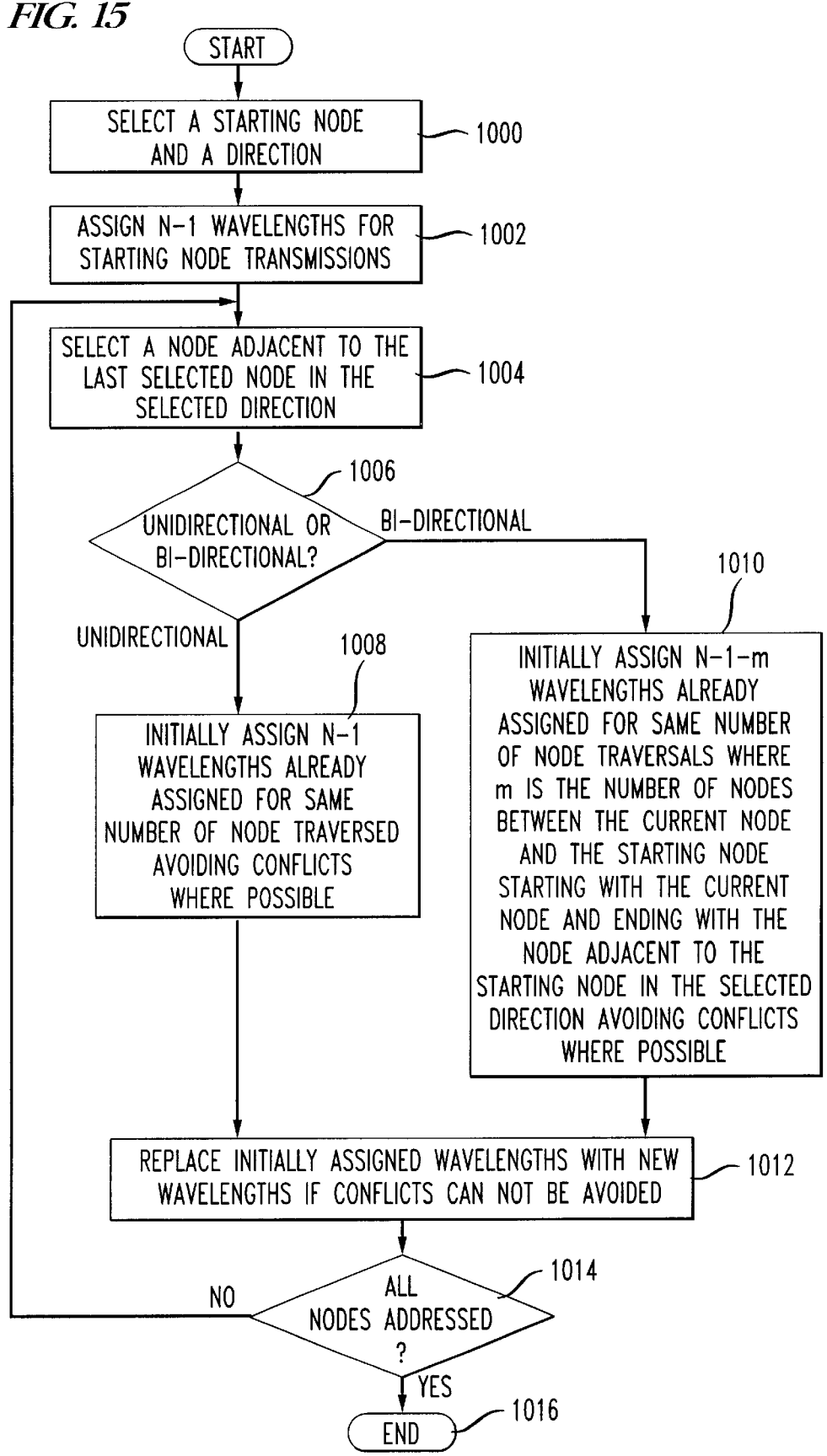

WAVELENGTH RE-USE

BACKGROUND OF THE INVENTION

1. Field of Invention

This invention relates to methods and apparatus for wavelength reuse.

2. Description of Related Art

Data transmissions often require that multiple transmissions of a same wavelength along a same medium be avoided. When multiple transmissions for a single wavelength propagate along a same medium (optical fiber, coax, twisted pair, etc.), the multiple transmissions may collide, interact or conflict with each other causing reduction in signal quality such as lower signal to noise ratio or increased cross talk, for example. Thus, new technology is needed to avoid transmission conflicts.

SUMMARY OF THE INVENTION

This invention provides methods for assigning wavelengths and apparatus for using the assigned wavelengths. Nodes of a network are interconnected to adjacent nodes via either a unidirectional or bidirectional connection. Wavelengths are assigned to destination nodes so that transmissions from any node within the network traverses connections and nodes until the transmission is received by a destination node. The destination node receives transmissions of assigned wavelengths and prevents the transmissions from being further transmitted so that a transmission propagates within the network until received by the destination node.

The invention assigns wavelengths to nodes in such a way that wavelengths may be reused, thus achieving a minimum number of wavelengths for any network. First, a starting node and a direction is selected within the network. N−1 wavelengths are assigned to the starting node where N is a number of nodes in the network. A second node adjacent to the starting node is selected and N−1 wavelengths already assigned to the starting node are tentatively assigned to the second node while avoiding conflicts where possible. A conflict occurs when a transmission by the second node to a destination node may traverse a connection that may already be traversed by a transmission of the same wavelength by the starting node. New wavelengths are assigned to the second node for destination nodes of which no prior assigned wavelengths may be used due to conflicts. Then, a third node is selected and wavelengths are assigned as for the second node except all prior assigned wavelengths are tested for conflicts first before assigning new wavelengths. The process continues until all the nodes are selected and wavelengths assigned. The above assignment may be applied for unidirectional or bidirectional connections. For bidirectional connections, the same wavelength may be used for transmission in both directions without a conflict.

BRIEF DESCRIPTION OF THE DRAWINGS

The invention is described in detail with reference to the following figures wherein like numerals reference like elements, and wherein:

FIG. 15 shows a flowchart of a process for assigning wavelengths within a sub-network.

DETAILED DESCRIPTION OF PREFERRED EMBODIMENTS

Figure 1:
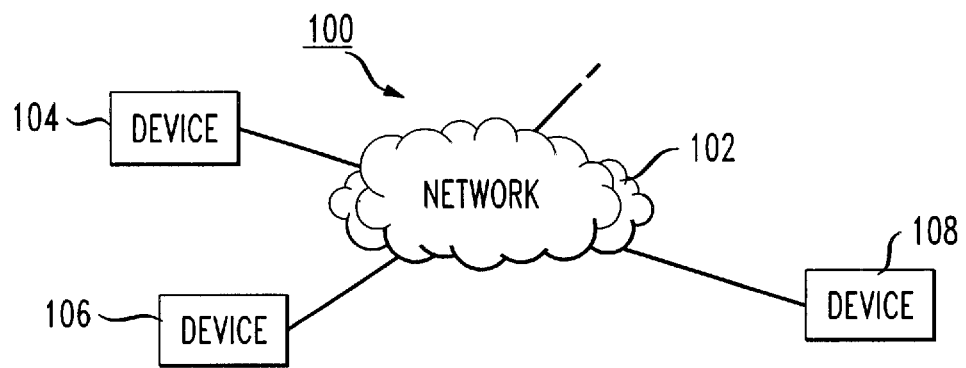
FIG. 1 is a block diagram of a communication system.

FIG. 1 shows a communication system 100 that includes a network 102 and devices 104–108 coupled to the network 102. The network 102 may be organized based on various different architectures. Depending on the architecture, different bandwidth utilization techniques may be applied. This invention relates to networks where nodes of the networks are connected in a ring structure where each node is connected to an adjacent node. For the remainder of the description, sub-networks organized in the ring structure are used as an example for discussion.

Figure 2:
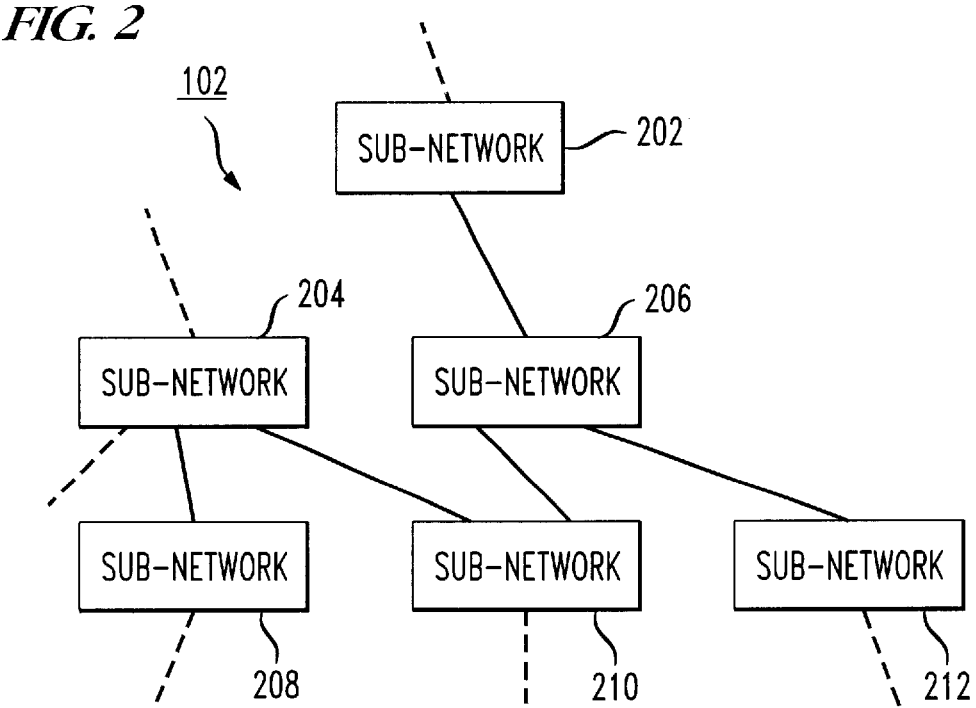
FIG. 2 is a block diagram of a sub-network architecture for the network shown in FIG. 1.
Figure 3:
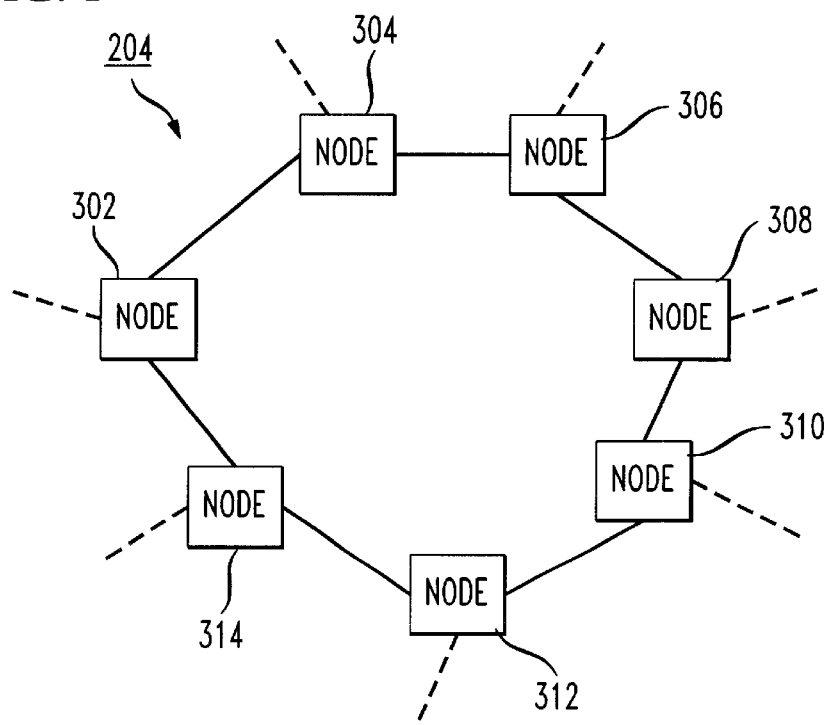
FIG. 3 is an exemplary block diagram of a sub-network.

FIG. 2 shows a sub-network architecture which may include sub-networks 202–212. The sub-networks 202–212 may communicate with one another via paths shown as solid lines or to other sub-networks or devices via dashed lines. Each of the sub-networks 202–212 may include a plurality of nodes. For example, FIG. 3 shows the sub-network 204 to include nodes 302–314. The nodes 302–314 may be connected to one another via a ring architecture so that nodes 302–314 communicate with each other via the ring connections while communication with other sub-networks may be performed by one or more of the nodes via connections shown as dashed lines.

Figure 4:
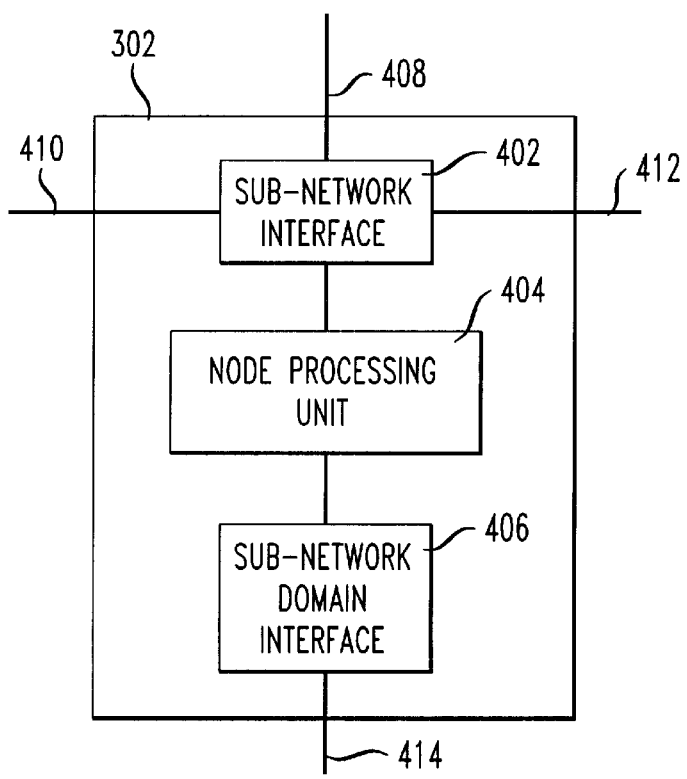
FIG. 4 is an exemplary diagram of a node of a sub-network.

FIG. 4 shows an exemplary block diagram of the node 302 which also represents the block diagrams of other nodes 304–314. The node 302 may include a sub-network interface 402, a node processing unit 404 and a sub-network domain interface 406. The sub-network domain interface 406 interfaces with other sub-networks or devices for which the node 302 serves as a link. The sub-network interface 402 provides connections 410 and 412 to other nodes of the same sub-network and connection 408 to other sub-networks. Communication signals are received or transmitted via the connections 408–412.

Figure 5:
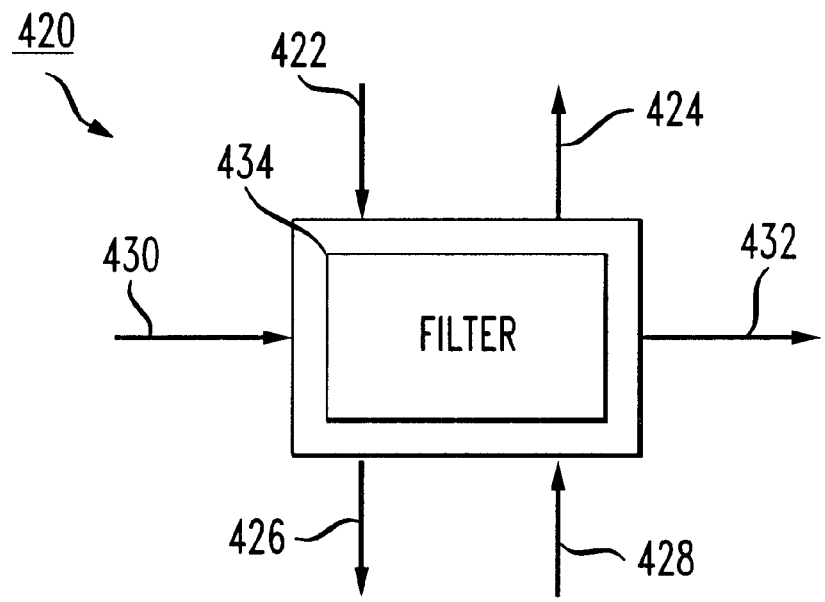
FIG. 5 is a block diagram of a sub-network interface shown in FIG. 4 that has unidirectional connections to other nodes of the sub-network.
Figure 6:
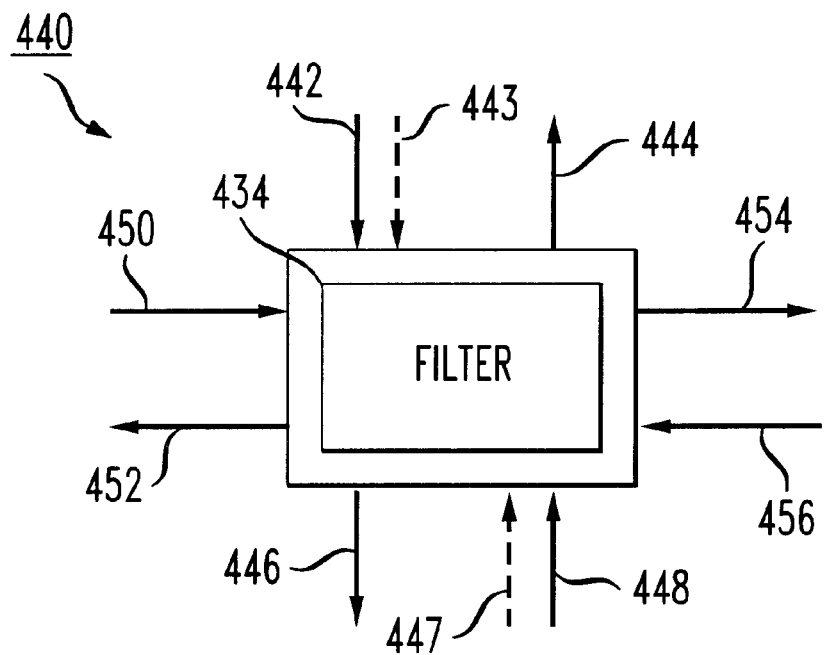
FIG. 6 shows a sub-network interface shown in FIG. 4 that has bidirectional connections to other nodes of the same sub-network.

FIGS. 5 and 6 show exemplary block diagrams of the sub-network interface 420 and 440. In FIG. 5, the sub-network interface 420 supports unidirectional connections for intra-sub-network communication via connections 430 and 432, bidirectional connections between other sub-networks 202–212 along connections 422 and 424 and bidirectional connections with the node processing unit 404 of an associated node 302–314 via connections 426 and 428. The sub-network interface 420 includes a filter 434 so that frequencies or wavelengths which are designated to be received by the associated node processing unit 404 are directed to the connection 426 for sending to the associated node processing unit 404. For example, if frequencies or wavelengths received from either the connections 422 or 430 are designated for the associated node processing unit 404, then the filter 434 directs those frequencies or wavelengths to the connection 426 and prevents those frequencies or wavelengths from being further transmitted via connections 424 and 432.

The filter 434 may be designed to direct a first set of frequencies or wavelengths to the connection 424, a second set of frequencies or wavelengths to the connection 432 and a third set of frequencies or wavelengths to the connection 426. In this way, wavelengths may be directly associated with destination nodes 302–314 so that if a communication is desired between two nodes 302–314, the transmitting node may simply select a proper frequency or wavelength assigned to the destination node 302–314 and transmit the communication via the proper frequency or wavelength through the sub-network interface 420. The filter 434 of the sub-network interface 420 automatically sends the frequency or wavelength to the proper connection 424 or 432.

The sub-network interface 440 shown in FIG. 6 supports bidirectional connections 450–456 among nodes of a sub-network 202–212. Connections 442 and 444 provide interfaces with other sub-networks 202–212. The connection 442 may be directed to one of the two bidirectional connections 452 or 454 by convention. For example, the signals received via the connection 442 may be directed to either the connection 454 or the connection 446 based on the frequency or wavelength. However, another connection 453 may be provided so that input signals may be directed to either 452 via the connection 453 or the connection 454 via the connection 442, for example. The connection 446 provides interface with the associated network processing unit 404 and the connection 448 provides an output interface from the associated node processing unit 404 to the connection 444 to other sub-networks 202–212 or to one of the intra-sub-network connections 452 or 454. Similarly, an optional connection 447 may be provided so that dedicated connections may be provided for the associated node processing unit 404 to both the connections 452 and 454.

Figure 7:
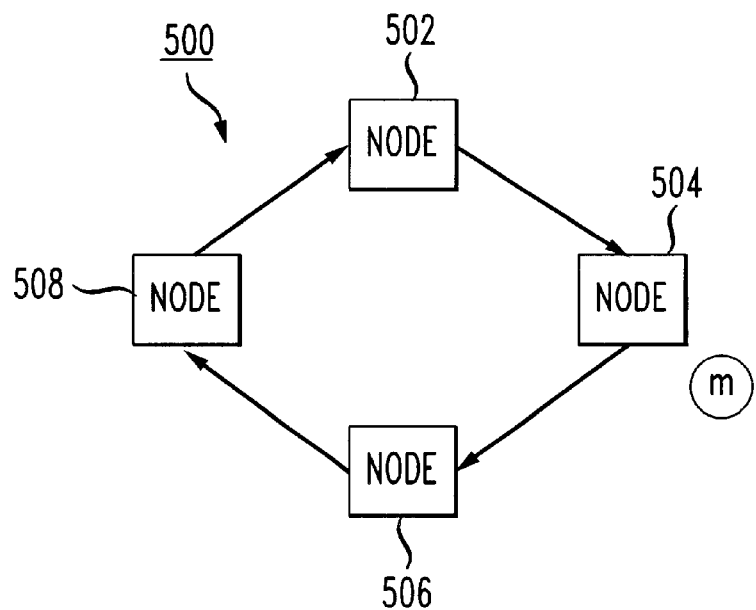
FIG. 7 shows a unidirectional sub-network having four nodes.

FIG. 7 shows an exemplary sub-network 500 which includes four nodes 502, 504, 506 and 508. The nodes 502–508 are connected by unidirectional connections as shown by the arrows. The unidirectional connections may be a single coaxial line, a single optical fiber, one twisted pair or a wireless connection.

To reduce processing power of respective node processing units 404, each of the nodes are assigned frequencies or wavelengths (hereinafter referred to as wavelengths only) so that the filters 434 within each of the respective sub-network interfaces 420 may automatically route a transmission at a wavelength that has been assigned to an associated node 502–508 and removes that transmission from being further transmitted.

For example, assume that $\lambda 1$ is assigned to node 502, $\lambda 2$ is assigned to node 504, $\lambda 3$ is assigned to node 506 and $\lambda 4$ is assigned to node 508. When the node 502 desires to communicate with the node 506, information is modulated onto a carrier having the wavelength of $\lambda 3$ and the modulated carrier is transmitted to the node 504. When the $\lambda 3$ modulated carrier is received, the sub-network interface 420 passes the $\lambda 3$ modulated carrier to the node 506 without any processing by the node processing unit 404 of the node 504. When the node 506 receives the $\lambda 3$ modulated carrier, the filter 434 of the sub-network interface 420 directs the received modulated carrier to the associated node processing unit 404 of the node 506 and prevents the $\lambda 3$ modulated carrier from being further propagated to the node 508. In this way, the $\lambda 3$ modulated carrier transmitted by the node 502 only travels from the node 502 to the node 504 and to the node 506. The $\lambda 3$ modulated carrier does not travel from the node 506 to the node 508 or to the node 502.

Similarly, if the node 502 desires to communicate with the node 508, the node 502 modulates the information onto a carrier of wavelength $\lambda 4$ and transmits the $\lambda 4$ modulated carrier to the node 504. When the node 504 desires to communicate with the node 502, information is modulated onto a carrier having the wavelength $\lambda 1$ and transmits the $\lambda 1$ modulated carrier to the node 506. Note that node 506 is separated from node 502 by m nodes (particularly node 504, and thus m=1) as further explained below.

For the sub-network wavelength assignment scheme described above, each wavelength is transmitted from a source node 502–508, traverses intermediate nodes 502–508 and is received and extinguished at a destination node 502–508. Only one transmission of a same wavelength should travel along a path (i.e., traverse connections and nodes 502–508) at any one time. Otherwise, two or more transmissions of the same wavelength along the same path may collide and/or interact with each other and cause degradation to signal quality such as signal to noise ratio or crosstalk, for example. Thus, wavelength assignments to the nodes should guarantee that each transmitted wavelength is the only transmission at that wavelength that is traveling along any one path.

Under the above constraints and in the worst case, N(N−1) wavelengths is required to guarantee that no two transmissions at the same wavelength traverse the same path in the sub-network 202–212 at the same time, where N is the number of nodes in the sub-network 202–212. For example, for sub-network 500, node 502 needs three wavelengths to transmit information to the three other nodes 504, 506 and 508. Similarly, the node 504 needs three wavelengths to transmit information to nodes 506, 508 and 502. To avoid two transmissions of the same wavelength over a common path, the wavelengths transmitted by the node 502 may be made different than the wavelengths transmitted by the node 504. Since there are four nodes 502, 504, 506 and 508 (N=4) and each node requires three unique wavelengths (N−1) to transmit information to the three other nodes 502–508, the total number of wavelengths required is N(N−1)=4(4−1) or 12.

If the above wavelength assignment scheme is implemented for sub-networks having hundreds of nodes, the number of wavelengths may be quickly exhausted. For example, for a 100 node sub-network, the number of wavelengths required would be 100(100−1) or 9,900. Thus, this invention provides a technique for reusing wavelengths so that a smaller number of wavelengths may be sufficient to support transmissions within a sub-network 202–212.

Table 1 below shows a wavelength assignment scheme that assigns only seven instead of twelve wavelengths for the sub-network 500.

TABLE 1

|    | 1 | 2 | 3 | 4 | 1 | 2 | 3 | 4 |
|----|---|---|---|---|---|---|---|---|
| 12 | x | λ1 |   |   |   | λ1 |   |   |
| 13 | x | λ2 | λ2 |   |   | λ2 | λ2 |   |

TABLE 1-continued

|    | 1 | 2  | 3  | 4  | 1  | 2  | 3  | 4  |
|----|---|----|----|----|----|----|----|----|
| 14 | x | λ3 | λ3 | λ3 |    | λ3 | λ3 | λ3 |
| 23 | x | x  | λ1 |    |    |    | λ1 |    |
| 24 | x | x  | λ4 | λ4 |    |    | λ4 | λ4 |
| 21 | x | x  | λ5 | λ5 | λ5 |    | λ5 | λ5 |
| 34 | x | x  | x  | λ1 |    |    |    | λ1 |
| 31 | x | x  | x  | λ2 | λ2 |    |    | λ2 |
| 32 | x | x  | x  | λ6 | λ6 | λ6 |    | λ6 |
| 41 | x | x  | x  | x  | λ1 |    |    |    |
| 42 | x | x  | x  | x  | λ4 | λ4 |    |    |
| 43 | x | x  | x  | x  | λ7 | λ7 | λ7 |    |

The top row in Table 1 shows the nodes of the sub-network 500 labeled as 1, 2, 3 and 4. The first column of Table 1 shows all possible source and destination nodes. For example, node 1 may transmit to nodes 2, 3 and 4 (i.e., 12, 13 and 14) while node 2 may transmit to nodes 3, 4 and 1 (i.e., 23, 24 and 21), and so on. The "x"s in Table 1 indicate that wavelength assignments are either not required or assigned elsewhere. For example, node 1 is not required to transmit to itself and thus the blocks corresponding to transmitting between node 1 and node 1 are filled with "x"s.

The wavelengths assigned to node 1 are λ1, λ2 and λ3 corresponding to destination nodes 2, 3 and 4. λ1 only traverses the connection between node 1 and node 2. λ1 does not traverse the connections between the nodes 2 and 3 or 3 and 4. Thus, for the 12 transmission, the blocks corresponding to the destination nodes 3 and 4 are left blank and the blocks corresponding to the destination node 2 are labeled with λ1. λ2 is used to transmit between nodes 1 and 3. Thus, λ2 traverses: 1) the connection between nodes 1 and 2; 2) node 2; and 3) the connection between nodes 2 and 3; and λ2 is received by the destination node 3. Thus, for the 13 transmission, the blocks corresponding to the nodes 2 and 3 are filled with λ2 and the blocks corresponding to the nodes 4 and 1 are left blank. λ3 is assigned node 1 for transmissions between the nodes 1 and 4. Thus, λ3 traverses: 1) the connection between nodes 1 and 2; 2) node 2; 3) the connection between nodes 2 and 3; 4) node 3; and 5) the connection between nodes 3 and 4, and λ3 is finally received and extinguished at node 4. Thus, the blocks corresponding to the nodes, 2, 3 and 4 are filled with λ3 and the blocks corresponding to the node 1 is left blank. The wavelengths assigned to the node 1 generate a pattern of wavelengths as shown in Table 1, rows 2–4 and columns 2–5. This pattern is repeated for the second cycle of destination nodes.

A single wavelength may be transmitted by a node 502–508 and received by the same node 502–508 because the filter 434 within the sub-network interface 420 may receive a wavelength directed to the corresponding node processing unit 404 and also receive a transmission of the same wavelength from the node processing unit 404 for transmission to other nodes 502–508 of the sub-network without permitting the two transmissions of the same wavelength to interact with each other. Thus, λ1 may be used for transmissions between node 2 and node 3 because the sub-network interface 420 of the node 2 may receive λ1 from the node 1 and transmit λ1 to the node 3 simultaneously without allowing the two transmissions to interact with each other. Accordingly, Table 1 indicates that the transmission between nodes 2 and 3 is also λ1.

The transmissions between nodes 2 and 4 must receive a new wavelength. λ2 cannot be used again for such a transmission because if used, node 3 would receive and extinguish the λ2 transmission and thus prevent the λ2 transmission intended for the node 4 from being further transmitted. Thus, the transmission between nodes 2 and 4 would fail. Accordingly, as shown in Table 1, a new wavelength λ4 is assigned for transmission between nodes 2 and 4. The transmission between nodes 2 and 1 is also assigned a new wavelength λ5 because λ3 cannot be reused due to similar reasons.

λ1 may be reused again for transmissions between nodes 3 and 4 and λ2 may be used for transmission between nodes 3 and 1. λ2 is extinguished by node 3 and does not traverse the connection between nodes 3 and 4, node 4 and the connection between nodes 4 and 1. A new wavelength λ6 may be assigned for transmission between the nodes 3 and 2 because λ3 cannot be reused due to interference at nodes 4 and 2 as indicated by the blocks corresponding to transmission between nodes 1 and 4.

λ1 may again be assigned for transmission between nodes 4 and 1, and λ4 may be assigned for transmissions between nodes 4 and 2. A new wavelength λ7 may be assigned for transmissions between nodes 4 and 3 because while λ3 is received by node 4 and thus may be transmitted by node 4, λ3 traverses the connection between nodes 1 and 4 and thus will interfere with a possible transmission between nodes 4 and 1.

An analysis of the wavelength assignments in Table 1 indicates that for transmissions between adjacent nodes (i.e., nodes 1 and 2, 2 and 3, 3 and 4, and 4 and 1), a single wavelength λ1 may be used. For transmissions between nodes that are separated by one other node (i.e., between nodes 1 and 3, 2 and 4, 3 and 1 and 4 and 2), two wavelengths λ2 and λ4 may be assigned and avoid interference. For transmissions between nodes 502–508 which are separated by two other nodes 502–508 (i.e., the nodes 1 and 4, 2 and 1, 3 and 2 and 4 and 3), a unique wavelength must be assigned for each node 502–508 to avoid interference.

Figure 8:
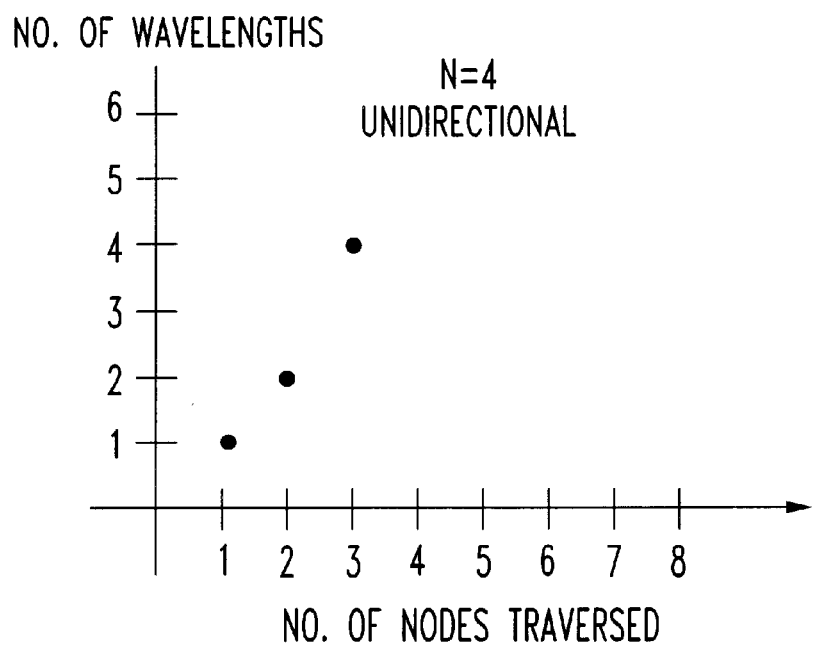
FIGS. 8–11 show graphs of a number of wavelengths that may be assigned versus a number of nodes traversed for numbers of nodes in the sub-network of 4, 5, 6 and 7.

FIG. 8 shows a graph plotting the relationship between number of wavelengths assigned and a number of nodes 502–508 traversed by the assigned wavelength where a destination node 502–508 is counted as a traversed node 502–508. Thus, one wavelength is assigned for a single traversal (i.e., no other intervening nodes). Two wavelengths are assigned for two nodes 502–508 traversed and four wavelengths are assigned for three nodes 502–508 traversed.

Figure 9:
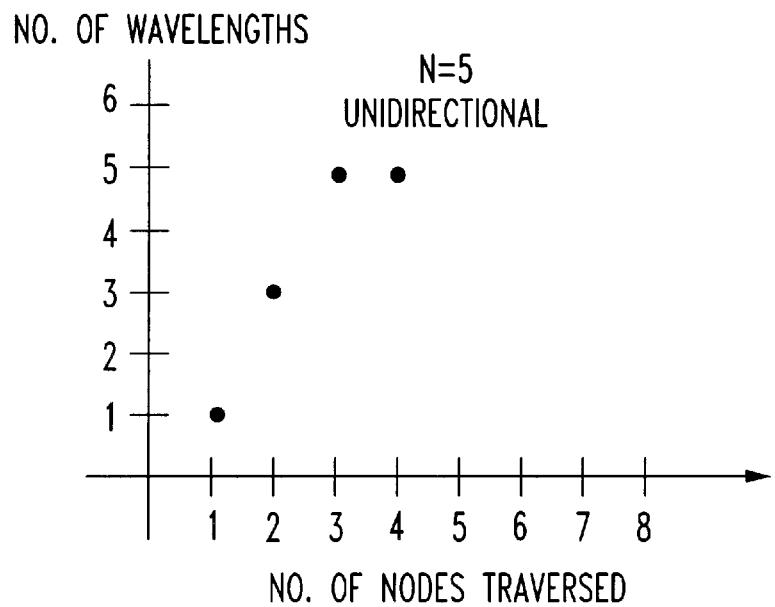
Figure 10:
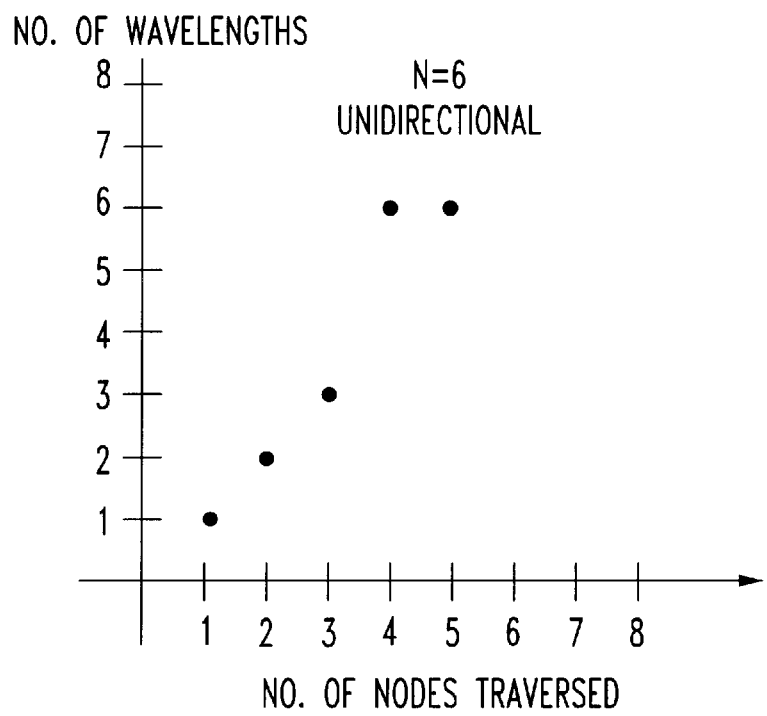
Figure 11:
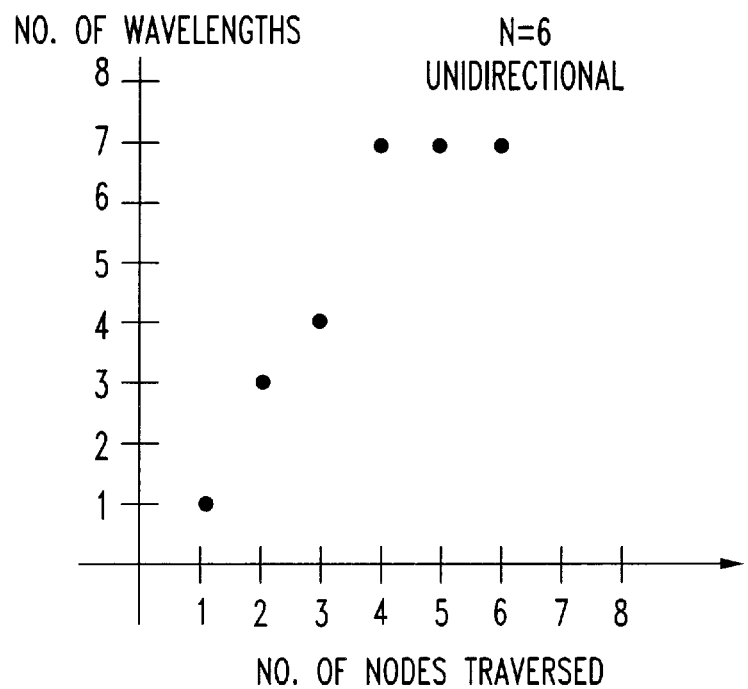

Table 2 below shows that 14 wavelengths are required to avoid interference for a five node sub-network (not shown) with unidirectional connections. Corresponding to Table 2, FIG. 9 shows a graph of the number of wavelengths assigned and the number of nodes traversed. Similarly, Tables 3 and 4 show the wavelength assignments for sub-networks having six and seven nodes (not shown), respectively. FIGS. 10 and 11 show the graphs of the number of wavelengths and the number of nodes traversed for the above sub-networks.

TABLE 2

|    | 1 | 2  | 3  | 4  | 5  | 1  | 2  | 3  | 4  | 5  |
|----|---|----|----|----|----|----|----|----|----|----|
| 12 | x | λ1 |    |    |    |    | λ1 |    |    |    |
| 13 | x | λ2 | λ2 |    |    |    | λ2 | λ2 |    |    |
| 14 | x | λ3 | λ3 | λ3 |    |    | λ3 | λ3 | λ3 |    |
| 15 | x | λ4 | λ4 | λ4 | λ4 |    | λ4 | λ4 | λ4 | λ4 |
| 23 | x | x  | λ1 |    |    |    |    | λ1 |    |    |
| 24 | x | x  | λ5 | λ5 |    |    |    | λ5 | λ5 |    |
| 25 | x | x  | λ6 | λ6 | λ6 |    |    | λ6 | λ6 | λ6 |
| 21 | x | x  | λ7 | λ7 | λ7 | λ7 |    | λ7 | λ7 | λ7 |
| 34 | x | x  | x  | λ1 |    |    |    |    | λ1 |    |

TABLE 2-continued

|    | 1 | 2 | 3 | 4  | 5   | 1  | 2  | 3   | 4   | 5   |
|----|---|---|---|----|-----|----|----|-----|-----|-----|
| 35 | x | x | x | λ2 | λ2  |    |    |     | λ2  | λ2  |
| 31 | x | x | x | λ8 | λ8  | λ8 |    |     | λ8  | λ8  |
| 32 | x | x | x | λ9 | λ9  | λ9 | λ9 |     | λ9  | λ9  |
| 45 | x | x | x | x  | λ1  |    |    |     |     | λ1  |
| 41 | x | x | x | x  | λ5  | λ5 |    |     |     | λ5  |
| 42 | x | x | x | x  | λ10 | λ10| λ10|     |     | λ3  |
| 43 | x | x | x | x  | λ11 | λ11| λ11| λ11 |     | λ10 |

TABLE 2-continued

|    | 1 | 2 | 3 | 4 | 5 | 1   | 2   | 3   | 4   | 5 |
|----|---|---|---|---|---|-----|-----|-----|-----|---|
| 51 | x | x | x | x | x | λ1  |     |     |     |   |
| 52 | x | x | x | x | x | λ12 | λ12 |     |     |   |
| 53 | x | x | x | x | x | λ13 | λ13 | λ13 |     |   |
| 54 | x | x | x | x | x | λ14 | λ14 | λ14 | λ14 |   |

TABLE 3

|    | 1 | 2  | 3   | 4   | 5   | 6   | 1   | 2   | 3   | 4   | 5   | 6   |
|----|---|----|-----|-----|-----|-----|-----|-----|-----|-----|-----|-----|
| 12 | x | λ1 |     |     |     |     |     | λ1  |     |     |     |     |
| 13 | x | λ2 | λ2  |     |     |     |     | λ2  | λ2  |     |     |     |
| 14 | x | λ3 | λ3  | λ3  |     |     |     | λ3  | λ3  | λ3  |     |     |
| 15 | x | λ4 | λ4  | λ4  | λ4  |     |     | λ4  | λ4  | λ4  | λ4  |     |
| 16 | x | λ5 | λ5  | λ5  | λ5  | λ5  |     | λ5  | λ5  | λ5  | λ5  | λ5  |
| 23 | x | x  | λ1  |     |     |     |     |     | λ1  |     |     |     |
| 24 | x | x  | λ6  | λ6  |     |     |     |     | λ6  | λ6  |     |     |
| 25 | x | x  | λ7  | λ7  | λ7  |     |     |     | λ7  | λ7  | λ7  |     |
| 26 | x | x  | λ8  | λ8  | λ8  | λ8  |     |     | λ8  | λ8  | λ8  | λ8  |
| 21 | x | x  | λ9  | λ9  | λ9  | λ9  |     |     | λ9  | λ9  | λ9  | λ9  |
| 34 | x | x  | x   | λ1  |     |     |     |     |     | λ1  |     |     |
| 35 | x | x  | x   | λ2  | λ2  |     |     |     |     | λ2  | λ2  |     |
| 36 | x | x  | x   | λ10 | λ10 | λ10 |     |     |     | λ10 | λ10 | λ10 |
| 31 | x | x  | x   | λ11 | λ11 | λ11 | λ11 |     |     | λ11 | λ11 | λ11 |
| 32 | x | x  | x   | λ12 | λ12 | λ12 | λ12 | λ12 |     | λ12 | λ12 | λ12 |
| 45 | x | x  | x   | x   | λ1  |     |     |     |     |     | λ1  |     |
| 46 | x | x  | x   | x   | λ6  | λ6  |     |     |     |     | λ6  | λ6  |
| 41 | x | x  | x   | x   | λ3  | λ3  | λ3  |     |     |     | λ3  | λ3  |
| 42 | x | x  | x   | x   | λ13 | λ13 | λ13 | λ13 |     |     | λ13 | λ13 |
| 43 | x | x  | x   | x   | λ14 | λ14 | λ14 | λ14 | λ14 |     | λ14 | λ14 |
| 56 | x | x  | x   | x   | x   | λ1  |     |     |     |     |     | λ1  |
| 51 | x | x  | x   | x   | x   | λ2  | λ2  |     |     |     |     | λ2  |
| 52 | x | x  | x   | x   | x   | λ7  | λ7  | λ7  |     |     |     | λ7  |
| 53 | x | x  | x   | x   | x   | λ15 | λ15 | λ15 | λ15 | λ15 |     | λ15 |
| 54 | x | x  | x   | x   | x   | λ16 | λ16 | λ16 | λ16 | λ16 |     | λ16 |
| 61 | x | x  | x   | x   | x   | x   | λ1  |     |     |     |     |     |
| 62 | x | x  | x   | x   | x   | x   | λ6  | λ6  |     |     |     |     |
| 63 | x | x  | x   | x   | x   | x   | λ10 | λ10 | λ10 |     |     |     |
| 64 | x | x  | x   | x   | x   | x   | λ17 | λ17 | λ17 | λ17 |     |     |
| 65 | x | x  | x   | x   | x   | x   | λ18 | λ18 | λ18 | λ18 | λ18 |     |

TABLE 4

|    | 1 | 2  | 3   | 4   | 5   | 6   | 7   | 1   | 2   | 3   | 4   | 5   | 6   | 7   |
|----|---|----|-----|-----|-----|-----|-----|-----|-----|-----|-----|-----|-----|-----|
| 12 | x | λ1 |     |     |     |     |     |     | λ1  |     |     |     |     |     |
| 13 | x | λ2 | λ2  |     |     |     |     |     | λ2  | λ2  |     |     |     |     |
| 14 | x | λ3 | λ3  | λ3  |     |     |     |     | λ3  | λ3  | λ3  |     |     |     |
| 15 | x | λ4 | λ4  | λ4  | λ4  |     |     |     | λ4  | λ4  | λ4  | λ4  |     |     |
| 16 | x | λ5 | λ5  | λ5  | λ5  | λ5  |     |     | λ5  | λ5  | λ5  | λ5  | λ5  |     |
| 17 | x | λ6 | λ6  | λ6  | λ6  | λ6  | λ6  |     | λ6  | λ6  | λ6  | λ6  | λ6  | λ6  |
| 23 | x | x  | λ1  |     |     |     |     |     |     | λ1  |     |     |     |     |
| 24 | x | x  | λ7  | λ7  |     |     |     |     |     | λ7  | λ7  |     |     |     |
| 25 | x | x  | λ8  | λ8  | λ8  |     |     |     |     | λ8  | λ8  | λ8  |     |     |
| 26 | x | x  | λ9  | λ9  | λ9  | λ9  |     |     |     | λ9  | λ9  | λ9  | λ9  |     |
| 27 | x | x  | λ10 | λ10 | λ10 | λ10 | λ10 |     |     | λ10 | λ10 | λ10 | λ10 | λ10 |
| 21 | x | x  | λ11 | λ11 | λ11 | λ11 | λ11 |     |     | λ11 | λ11 | λ11 | λ11 | λ11 |
| 34 | x | x  | x   | λ1  |     |     |     |     |     |     | λ1  |     |     |     |
| 35 | x | x  | x   | λ2  | λ2  |     |     |     |     |     | λ2  | λ2  |     |     |
| 36 | x | x  | x   | λ12 | λ12 | λ12 |     |     |     |     | λ12 | λ12 | λ12 |     |
| 37 | x | x  | x   | λ13 | λ13 | λ13 | λ13 |     |     |     | λ13 | λ13 | λ13 | λ13 |
| 31 | x | x  | x   | λ14 | λ14 | λ14 | λ14 | λ14 |     |     | λ14 | λ14 | λ14 | λ14 |
| 32 | x | x  | x   | λ15 | λ15 | λ15 | λ15 | λ15 | λ15 |     | λ15 | λ15 | λ15 | λ15 |
| 45 | x | x  | x   | x   | λ1  |     |     |     |     |     |     | λ1  |     |     |
| 46 | x | x  | x   | x   | λ7  | λ7  |     |     |     |     |     | λ7  | λ7  |     |
| 47 | x | x  | x   | x   | λ3  | λ3  | λ3  |     |     |     |     | λ3  | λ3  | λ3  |
| 41 | x | x  | x   | x   | λ16 | λ16 | λ16 | λ16 |     |     |     | λ16 | λ16 | λ16 |
| 42 | x | x  | x   | x   | λ17 | λ17 | λ17 | λ17 | λ17 |     |     | λ17 | λ17 | λ17 |
| 43 | x | x  | x   | x   | λ18 | λ18 | λ18 | λ18 | λ18 | λ18 |     | λ18 | λ18 | λ18 |
| 56 | x | x  | x   | x   | x   | λ1  |     |     |     |     |     |     | λ1  |     |

TABLE 4-continued

| | 1 | 2 | 3 | 4 | 5 | 6 | 7 | 1 | 2 | 3 | 4 | 5 | 6 | 7 |
|---|---|---|---|---|---|---|---|---|---|---|---|---|---|---|
| 57 | x | x | x | x | x | λ2 | λ2 | | | | | | λ2 | λ2 |
| 51 | x | x | x | x | x | λ8 | λ8 | λ8 | | | | | λ8 | λ8 |
| 52 | x | x | x | x | x | λ19 | λ19 | λ19 | λ19 | | | | λ19 | λ19 |
| 53 | x | x | x | x | x | λ20 | λ20 | λ20 | λ20 | λ20 | | | λ20 | λ20 |
| 54 | x | x | x | x | x | λ21 | λ21 | λ21 | λ21 | λ21 | λ21 | | λ21 | λ21 |
| 67 | x | x | x | x | x | x | λ1 | | | | | | | λ1 |
| 61 | x | x | x | x | x | x | λ7 | λ7 | | | | | | λ7 |
| 62 | x | x | x | x | x | x | λ12 | λ12 | λ12 | | | | | λ12 |
| 63 | x | x | x | x | x | x | λ22 | λ22 | λ22 | λ22 | | | | λ22 |
| 64 | x | x | x | x | x | x | λ23 | λ23 | λ23 | λ23 | λ23 | | | λ23 |
| 65 | x | x | x | x | x | x | λ24 | λ24 | λ24 | λ24 | λ24 | λ24 | | λ24 |
| 71 | x | x | x | x | x | x | x | λ1 | | | | | | |
| 72 | x | x | x | x | x | x | x | λ25 | λ25 | | | | | |
| 73 | x | x | x | x | x | x | x | λ26 | λ26 | λ26 | | | | |
| 74 | x | x | x | x | x | x | x | λ27 | λ27 | λ27 | λ27 | | | |
| 75 | x | x | x | x | x | x | x | λ28 | λ28 | λ28 | λ28 | λ28 | | |
| 76 | x | x | x | x | x | x | x | λ29 | λ29 | λ29 | λ29 | λ29 | λ29 | |

From the graphs shown in FIGS. 8–11, it is apparent that a minimum number of wavelengths that may be assigned to avoid conflicts are different for sub-networks having an even number of nodes as compared to sub-networks having an odd number of nodes. For sub-networks 202–212 having even numbered nodes, the number of wavelengths increases linearly with the number of nodes traversed when the number of nodes traversed is less than or equal to N/2. The number of wavelengths that may be assigned is equal to N for the number of node traversals greater than N/2. Thus, the minimum number of wavelengths that may be assigned for sub-networks having unidirectional connections and even numbered nodes is:

$$\sum_{i=1}^{N/2} i + \sum_{(N/2)+1}^{(N-1)} N. \qquad (1)$$

The above expression may be reduced by standard techniques to be:

$$N(5N-6)/8 \qquad (2)$$

For sub-networks 202–212 with an odd number of nodes and unidirectional connections, the number of assigned wavelengths may be the number of nodes traversed plus 1 except for the wavelength assigned for transmission between adjacent nodes and when the number of nodes traversed is less than N/2. The number of assigned wavelengths is equal to N when the number of nodes traversed is greater than N/2. Thus, the minimum number of wavelengths that may be assigned for sub-networks having odd number of nodes and unidirectional connections is given by expressions (3) and (4) below:

$$-1 + \sum_{i=1}^{(N-1)/2} (i+1) + \sum_{i=(N+1)/2}^{(N-1)} N; \text{ and} \qquad (3)$$

$$(5N^2-13)/8. \qquad (4)$$

Figure 12:
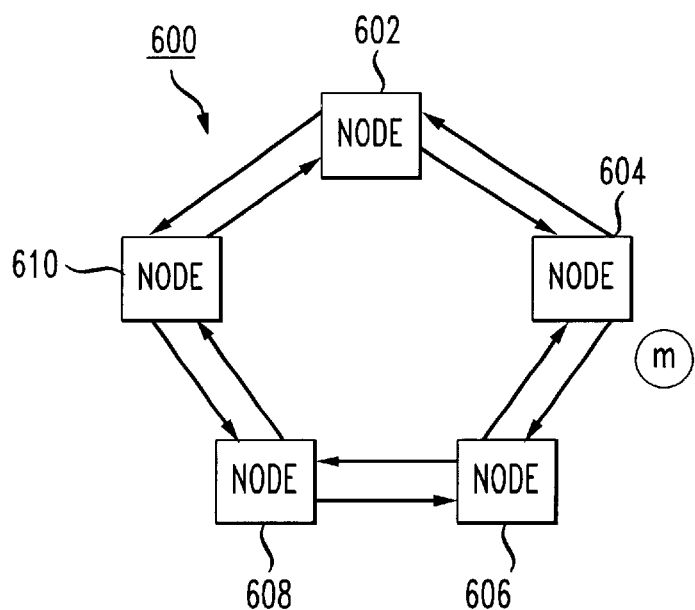
FIG. 12 shows an exemplary block diagram of a sub-network having five nodes and having bidirectional connections between the nodes.

FIG. 12 shows a sub-network 600 that includes five nodes 602–610 and bidirectional connections between nodes 602–610. Because bidirectional connections includes two separate communication mediums such as coaxial cables, optical fibers, etc., the same wavelengths may be transmitted in both directions between the same nodes. Table 5 below shows the wavelength assignments for the sub-network 600 where communications between nodes 602–610 for one of the directions is shown. It is assumed that the same wavelengths may be used for communications in the reverse direction without a conflict. Note that node 606 is separated from node 602 by m nodes (particularly node 604, and thus m=1) as further explained below.

TABLE 5

| | 1 | 2 | 3 | 4 | 5 |
|---|---|---|---|---|---|
| 12 | x | λ1 | | | |
| 13 | x | λ2 | λ2 | | |
| 14 | x | λ3 | λ3 | λ3 | |
| 15 | x | λ4 | λ4 | λ4 | λ4 |
| 23 | x | x | λ1 | | |
| 24 | x | x | λ5 | λ5 | |
| 25 | x | x | λ6 | λ6 | λ6 |
| 34 | x | x | x | λ1 | |
| 35 | x | x | x | λ2 | λ2 |
| 45 | x | x | x | x | λ1 |

Similar to the unidirectional case, the wavelength assignments for communication between the node 1 and the nodes 2, 3, 4 and 5 are λ1, λ2, λ3 and λ4. Because λ1 may be used for communication between nodes 2 and 1, a separate wavelength assignment need not be considered for the node 2 to node 1 transmissions. Thus, the node 2 wavelength assignments only consider transmissions between node 2, and nodes 3, 4 and 5. λ1 may be reused for communication between nodes 2 and 3 but new wavelengths λ5 and λ6 are required for communications between node 2 and nodes 4 and 5. Similarly, for communications between node 3 and nodes 4 and 5, λ1 may be used for communication between nodes 3 and 4 and λ2 for communication between nodes 3 and 5. Finally, λ1 may be assigned for communications between nodes 4 and 5.

Figure 13:
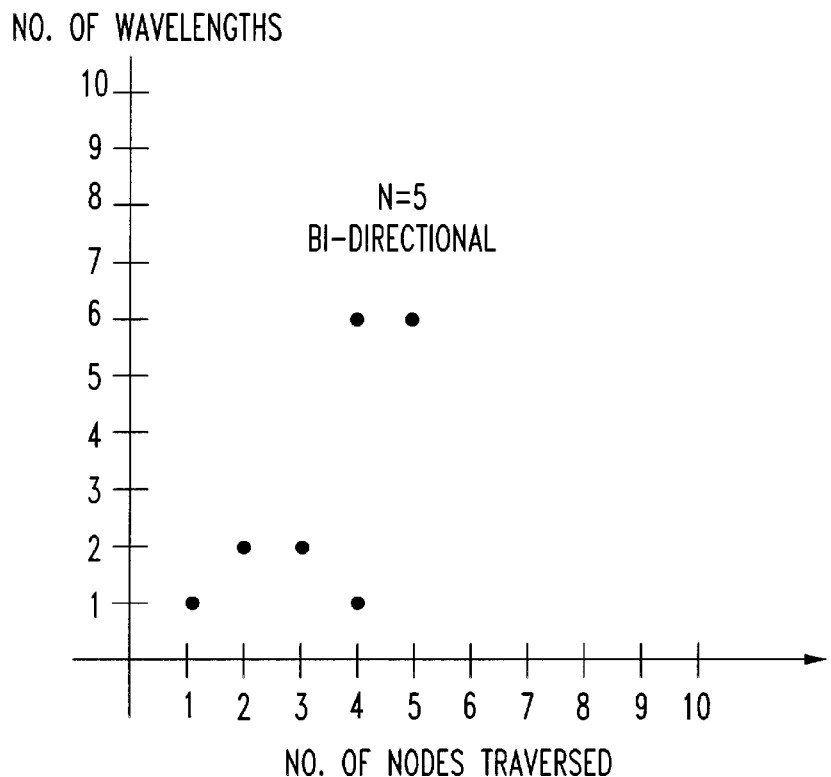
FIGS. 13 and 14 show graphs of a number of wavelengths assigned versus a number of nodes traversed for sub-networks having bidirectional connections.

FIG. 13 shows a graph of a number of wavelengths assigned and the number of nodes traversed for N=5 and bidirectional connections. As may be observed, the number of wavelengths increases linearly with a number of nodes traversed until the number of nodes traversed reaches N/2. The number of wavelengths assigned decreases linearly with the number of nodes traversed when the number of nodes traversed is greater than N/2.

Figure 14:
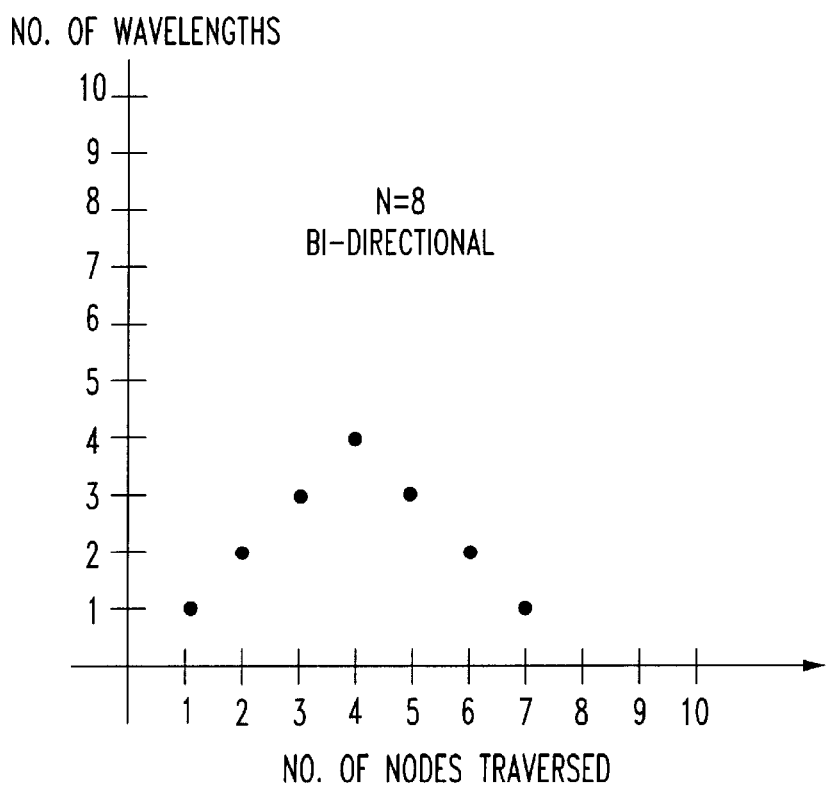

Table 6 shows the wavelength assignments for a sub-network having eight nodes and bidirectional connections (not shown). FIG. 14 shows a corresponding graph of the number of wavelengths assigned and the number of nodes traversed. Based on FIGS. 13 and 14, a minimum number of assigned wavelengths for N odd and bidirectional connections may be given by the expressions (5) and (6) below:

$$2 \times \sum_{i=1}^{(N-1)/2} i; \text{ and} \quad (5)$$

$$(N^2 - 1)/4. \quad (6)$$

A minimum number of assigned wavelengths for N even may be given by the expressions (7) and (8) below:

$$(N/2) + 2 \times \sum_{i=1}^{(N/2)-1} i; \text{ and} \quad (7)$$

$$N^2/4. \quad (8)$$

FIG. 15 shows a flowchart for a process for assigning wavelengths as described above. In step 1000 the process begins by selecting a starting a node and a direction of a sub-network 202–212, and goes to step 1002. In step 1002, the process assigns N−1 wavelengths for the starting node transmissions where N is a number of nodes in the sub-network 202–212, and goes to step 1004.

In step 1004, the process selects a node adjacent to the last selected node in the selected direction. Thus, the second node selected will be the node adjacent to the starting node in the selected direction. Then, the process goes to step 1006. In step 1006, the process determines whether the connection between the nodes are unidirectional or bidirectional. If unidirectional, the process goes to step 1008; otherwise, the process goes to step 1010.

In step 1008, the process initially assigns N−1 wavelengths already assigned for the same number nodes traversals avoiding conflicts where possible and goes to step 1012. In step 1010 the process initially assigned N−1−m wavelengths already assigned for the same number of node traversals where m is the number of nodes between the current node and the starting node. The wavelength assignments begins with the current node and ends with the node adjacent to the starting node in the selected direction. The above initial assignments avoid conflicts where possible. The process does not assign wavelengths to each of the selected nodes for all the nodes for the bidirection case because transmissions may be performed in the opposition direction using a separate medium so that wavelengths that are assigned for one direction may also be used for the opposite direction without conflict. After step 910, the process goes to step 1012.

In step 1012, the process replaces initially assigned wavelengths with new wavelengths if conflicts cannot be avoided and goes to step 1014. In step 1014, the process determines if all of the nodes have been addressed. If all the nodes have been addressed, the process goes to step 1016 and ends; otherwise, the process returns to step 1004 and selects another node.

While this invention has been described in conjunction with specific embodiments thereof, it is evident that many alternatives, modifications, and variations will be apparent to those skilled in the art. Accordingly, preferred embodiments of the invention as set forth herein are intended to be illustrative not limiting. Various changes may be made without departing from the spirit and scope of the invention.

What is claimed is:

1. A method for forming a network that includes a plurality of nodes, the method comprising:
   connecting each of the nodes of the network with two connections to at least one other node;
   allocating a number of wavelengths for the network so that a transmission of a wavelength is received by only one of the nodes;
   wherein one or more wavelengths are used for transmissions between more than one pair of transmitting and receiving nodes, and wherein connections among the nodes of the network are either bidirectional connections or unidirectional connections; and
   for unidirectional connections, the method further comprising assigning 1 wavelength for communication between adjacent nodes, assigning m+2 wavelengths for communication between nodes that are separated by m other nodes in a direction of the connections, where m is an integer number greater than 0 and less than N/2 where N is a total number of nodes in the network and N is odd, and assigning N wavelengths form equal to or greater than N/2.

2. The method of claim 1, wherein a minimum number of assigned wavelengths is:

$$-1 + \sum_{i=1}^{(N-1)/2} (i+1) + \sum_{i=(N+1)/2}^{(N-1)} N, \text{ for } N \text{ odd.}$$

3. The method of claim 1, wherein a minimum number of assigned wavelengths for N odd is $(5N^2-13)/8$.

4. A method for forming a network that includes a plurality of nodes, the method comprising:
   connecting each of the nodes of the network with two connections to at least one other node;
   allocating a number of wavelengths for the network so that a transmission of a wavelength is received by only one of the nodes;
   wherein one or more wavelengths are used for transmissions between more than one pair of transmitting and receiving nodes, and wherein connections among the nodes of the network are either bidirectional connections or unidirectional connections; and
   for unidirectional connections, the method further comprising assigning m+1 wavelengths for communication between nodes that are separated by m other nodes in a direction of the connections, where m is an integer number greater than or equal to 0 and less than or equal to N/2 where N is a total number of nodes in the network and N is even, and assigning N−m wavelengths for m greater than N/2 and less than N.

5. The method of claim 4, wherein a minimum number of assigned wavelengths is:

$$\sum_{i=1}^{N/2} i + \sum_{(N/2)+1}^{(N-1)} N, \text{ for } N \text{ even.}$$

6. The method of claim 4, wherein a minimum number of assigned wavelengths for N even is $N(5N-6)/8$.

7. A method for forming a network that includes a plurality of nodes, the method comprising:
   connecting each of the nodes of the network with two connections to at least one other node;
   allocating a number of wavelengths for the network so that a transmission of a wavelength is received by only one of the nodes;

wherein one or more wavelengths are used for transmissions between more than one pair of transmitting and receiving nodes, and wherein connections among the nodes of the network are either bidirectional connections or unidirectional connections; and for bidirectional connections, the method further comprising for a pre-selected direction, assigning m wavelengths for communication between nodes that are separated by m other nodes in each of the bidirectional connections for m greater than or equal to 0 and less than or equal to N/2, where N is the total number of nodes in the network, and N−m wavelengths for m greater than N/2 and less than N.

8. The method of claim 7, wherein a minimum number of assigned wavelengths for N odd is:

$$2 \times \sum_{i=1}^{(N-1)/2} i.$$

9. The method of claim 7, wherein a minimum number of assigned wavelengths for N odd is $(N^2-1)/4$.

10. The method of claim 7, wherein a minimum number of assigned wavelengths for N even is:

$$(N/2) + 2 \times \sum_{i=1}^{(N/2)-1} i.$$

11. The method of claim 7, wherein a minimum number of assigned wavelengths for N even is $N^2/4$.

12. A method for assigning wavelengths for transmission in a network that includes N nodes where N is an integer greater than 1, and each of the nodes has two connections to at least one other node, the method comprising:

selecting a first node of the nodes of the network as a starting node; and assigning N−1 wavelengths for communication between the starting node and every other node in the network where N is a total number of nodes in the network, one of the wavelengths being allocated for communication between the starting node and one other node;

selecting a second node adjacent to the starting node; and assigning a same wavelength, for communication between the second node and every other node for unidirectional connections among the nodes and to every other node other than the starting node for bidirectional connections among the nodes, wherein a new wavelength is assigned instead of the same wavelength if the same wavelength must traverse either the starting node or a node that is a destination node for the same wavelength transmitted by the starting node.

13. The method of claim 12, further comprising:

selecting a next node adjacent to a prior selected node; and assigning a same wavelength, for communication between the next node and every other node for unidirectional connections among the nodes and to every other node other than prior nodes already selected for bidirectional connections among the nodes, wherein a new wavelength is assigned instead of the same wavelength if the same wavelength must traverse either a node that transmitted the same wavelength or a node that is a destination node for the same wavelength transmitted by one of the prior nodes.

* * * * *